United States Patent
Kangas et al.

(10) Patent No.: US 7,463,243 B1
(45) Date of Patent: Dec. 9, 2008

(54) RFID WIRELESS COMPUTER MOUSE

(75) Inventors: Paul D. Kangas, Raleigh, NC (US); Jeff David Thomas, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/164,473

(22) Filed: Jun. 30, 2008

(51) Int. Cl.
*G09G 5/08* (2006.01)
(52) U.S. Cl. .................. 345/163; 345/164; 345/167
(58) Field of Classification Search ......... 345/156–179; 340/10.1, 572.1, 572.4; 341/20–34
See application file for complete search history.

(56) References Cited

U.S. PATENT DOCUMENTS

| 6,686,903 | B1 | 2/2004 | Peng et al. |
| 7,027,039 | B1 * | 4/2006 | Henty .................. 345/173 |
| 7,315,908 | B2 | 1/2008 | Anderson et al. |

* cited by examiner

*Primary Examiner*—Regina Liang
(74) *Attorney, Agent, or Firm*—Cantor Colburn LLP; Jason O. Piche

(57) ABSTRACT

An RFID wireless computer mouse system, comprising: a mouse having a single passive RFID circuit in signal communication with a computer having an RFID reader. The single passive RFID circuit operates the mouse such that the mouse provides signals indicative of X-Y coordinates to move a cursor on a display screen of the computer without the use of an internal or an external power source.

1 Claim, 4 Drawing Sheets

RFID WIRELESS COMPUTER MOUSE

BACKGROUND

This invention relates to an RFID wireless computer mouse system, and particularly to a system having a mouse that provides signals indicative of X-Y coordinates to move a cursor on a display screen of a computer without the use of batteries or a conventional power source.

Today's common mouse topology includes a wheel/axle configuration for each x and y direction and a moveable ball to turn the axles of the mouse in such directions. The direction of the moveable ball is typically detected by sensing the motion of the wheel/axle through various sensors, such as optical sensors. However, all current mouse designs require some type of local power source, either from a battery or DC power from a cable, to operate. The DC power is usually provided in the signal cable, which comes from the host computer, which is in signal communication with the computer or directly coupled to the computer. In short, today's mice can communicate wirelessly but still require an internal power source (e.g., batteries) or external power source (e.g., DC power).

SUMMARY

An exemplary embodiment of an RFID wireless computer mouse system, includes a mouse having a ball configured to move in an x-direction and a y-direction; an x-axis wheel and a y-axis wheel each configured to rotate in response to the movement of the ball, the x-axis wheel translates the motion of the ball in the x-direction while the y-axis wheel translates the motion of the ball in the y-direction; a first set of sensing devices and a second set of sensing devices, the first set of sensing devices detects the motion of the ball in the x-direction based on the movement of the x-axis wheel while the second set of sensing devices detects the motion of the ball in the y-direction based on the movement of the y-axis wheel; and a single passive RFID circuit coupled to the first set of sensing devices and the second set of sensing devices, the single passive RFID circuit receives a plurality of sensor inputs correspondingly from the first plurality of sensing devices and the second plurality of sensing devices indicative of the motion of the ball in the x-direction and the y-direction respectively, and the single passive RFID circuit stores the plurality of sensor inputs in a shift register as a stream of bits and serially shifts and transmits the stream of bits one bit at a time over an antenna of the single passive RFID circuit; and an RFID reader in signal communication with the single passive RFID circuit, the RFID reader decodes the stream of bits and converts the stream of bits into corresponding x-coordinates and y-coordinates used to move a cursor on a display screen of a computer, the single passive RFID circuit and the RFID reader move the cursor on the display screen of the computer, wherein the mouse operates without the use of an internal or a conventional power source.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
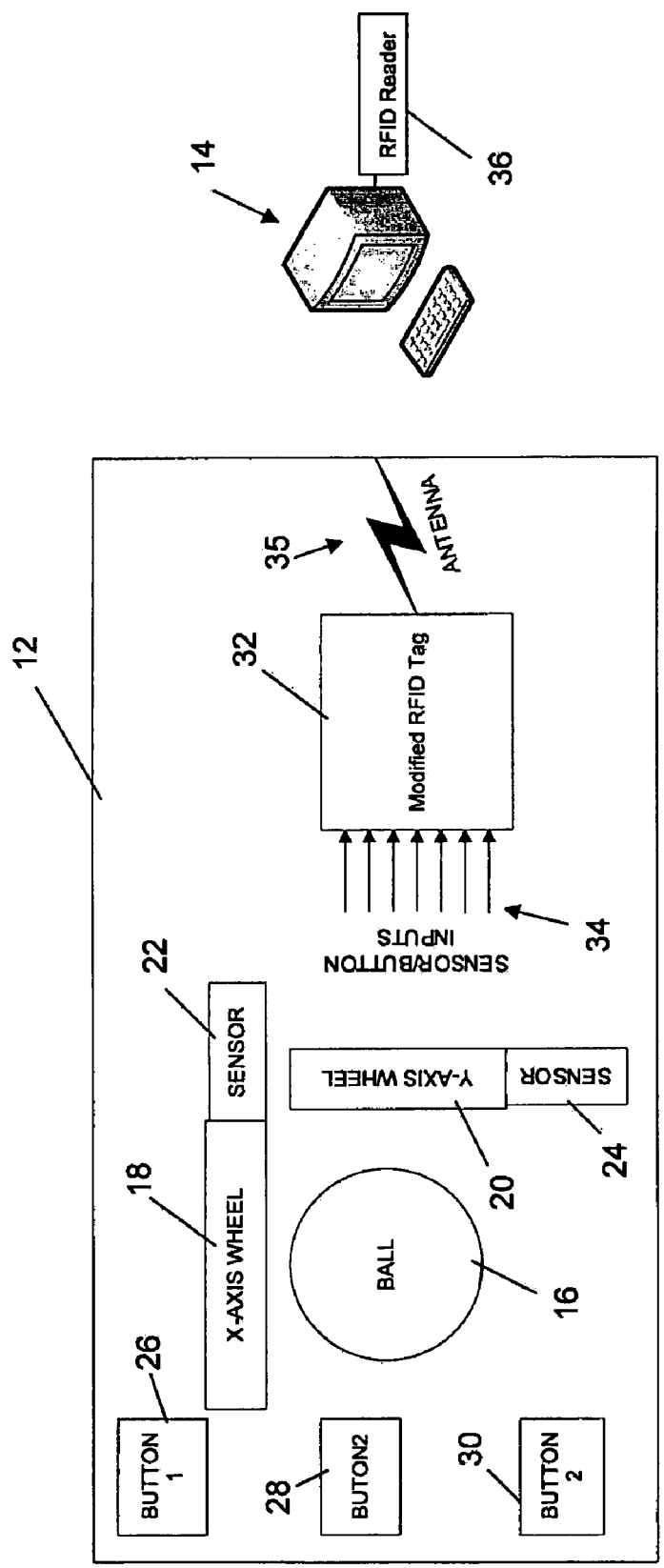
FIG. 1 illustrates a schematic diagram of an RFID wireless computer mouse system in accordance with one exemplary embodiment of the present invention.

The detailed description explains the preferred embodiments of the invention, together with advantages and features, by way of example with reference to the drawings.

DETAILED DESCRIPTION OF THE INVENTION

The present invention and the various features and advantageous details thereof are explained more fully with reference to the non-limiting embodiments that are illustrated in the accompany drawings and detailed in the following description. It should be noted that the features illustrated in the drawings are not necessarily drawn to scale. Descriptions of well-known or conventional components and processing techniques are omitted so as to not necessarily obscure the present invention in detail. The examples used herein are intended merely to facilitate an understanding of ways in which the invention may be practiced and to further enable those of skill in the art to practice the invention. Accordingly, the examples should not be construed as limiting the scope of the invention.

The inventors herein have recognized that the use of a single modified passive RFID tag or circuit having external signaling ports to receive sensor inputs from motion sensing devices in a mouse eliminates the need for an internal (e.g., batteries), external power source (e.g., DC voltage), or any conventional power generating device to power the same. The inventors herein have further recognized that a relatively short transmission range of passive RFID tags (several inches to over a foot) are useful in that adjacent computers using similar RFID mouse technology will not interfere with one another.

Now referring to the drawings, FIG. 1 is a simplified schematic illustrating the basic elements of a radio frequency identification (RFID) wireless computer mouse system 10 in accordance with one exemplary embodiment of the present invention. The system 10 includes a wireless computer mouse 12 in signal communication with a computer 14. The wireless computer mouse 12 comprises a ball 16, an x-axis wheel 18, a y-axis wheel 20, a first set of sensing devices 22, a second set of sensing devices 24, and mouse buttons 26, 28, and 30, which in accordance with one exemplary are mechanical switches. The x-axis wheel 18 and the y-axis wheel 20 rotate in response to ball 16 moving in the x-direction and the y-direction respectively. The movements of x-axis wheel 18 and y-axis wheel 20 correspondingly activate the first set of sensing devices 22 and the second set of sensing devices 24, which detect the motion of ball 16 in the x-direction and the y-direction respectively. The mouse 12 further includes a single passive RFID tag or circuit 32 modified to have external signaling ports for receiving sensor inputs 34 from the first set of sensing devices 22 and the second set of sensing devices 24 indicative of corresponding X-Y coordinates detected from the motion of ball 16. The sensor inputs 34 are filtered into stable bits of information, which are transmitted over an antenna 35 of the passive RFID tag 32 one bit at a time. The bits of information indicative of X-Y coordinates move a cursor on a display screen of the computer 14. The antenna 35 can be an integral part of the passive RFID tag or an external component depending on the application.

In accordance with one exemplary embodiment, computer 14 comprises a processor having a combination of hardware and/or software/firmware with a computer program that, when loaded and executed, permits the processor of the computer to operate such that it carries out the methods described herein. In accordance with one exemplary embodiment, computer 14 further includes an RFID reader 36 that decodes the bits of information from the passive RFID tag 32 based on the bit order and converts the received information into changing X-Y coordinates used to move the cursor across the display screen of the computer 14. The RFID reader 36 can be an integral part of the computer 14 or a separately attached component depending on the application.

The ball 16 can be any conventional ball that moves in both the x-direction and the y-direction at various rates under the control of an operator of the mouse. The x-axis wheel 18 contacts ball 16 and moves relative to the motion of ball 16. For example, if ball 16 rolls left along the x-axis, then x-axis wheel 18 rotates in a direction (e.g., clockwise) indicative of ball 16 moving in the left direction along the x-axis. When ball 16 rolls right along the x-axis, then x-axis wheel 18 rotates in another direction (e.g., counterclockwise) indicative of ball 16 moving in the right direction along the x-axis. When ball 16 moves up or down along the y-axis, then x-axis wheel 18 remains unmoved and y-axis wheel 20 moves accordingly.

Figure 2:
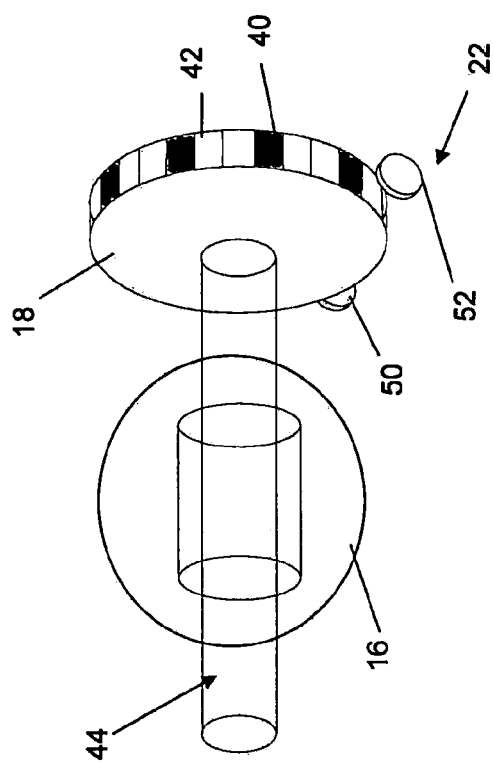
FIG. 2 illustrates a schematic diagram of a wheel and axle used to translate the motion of a mouse in accordance with one exemplary embodiment of the present invention.
Figure 3:
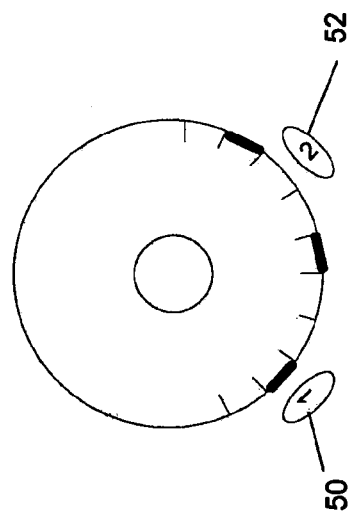
FIG. 3 illustrates a schematic diagram a set of sensing devices for detecting the motion of the mouse based on the motion of the wheel and axle in accordance with one exemplary embodiment of the present invention.
Figure 4:
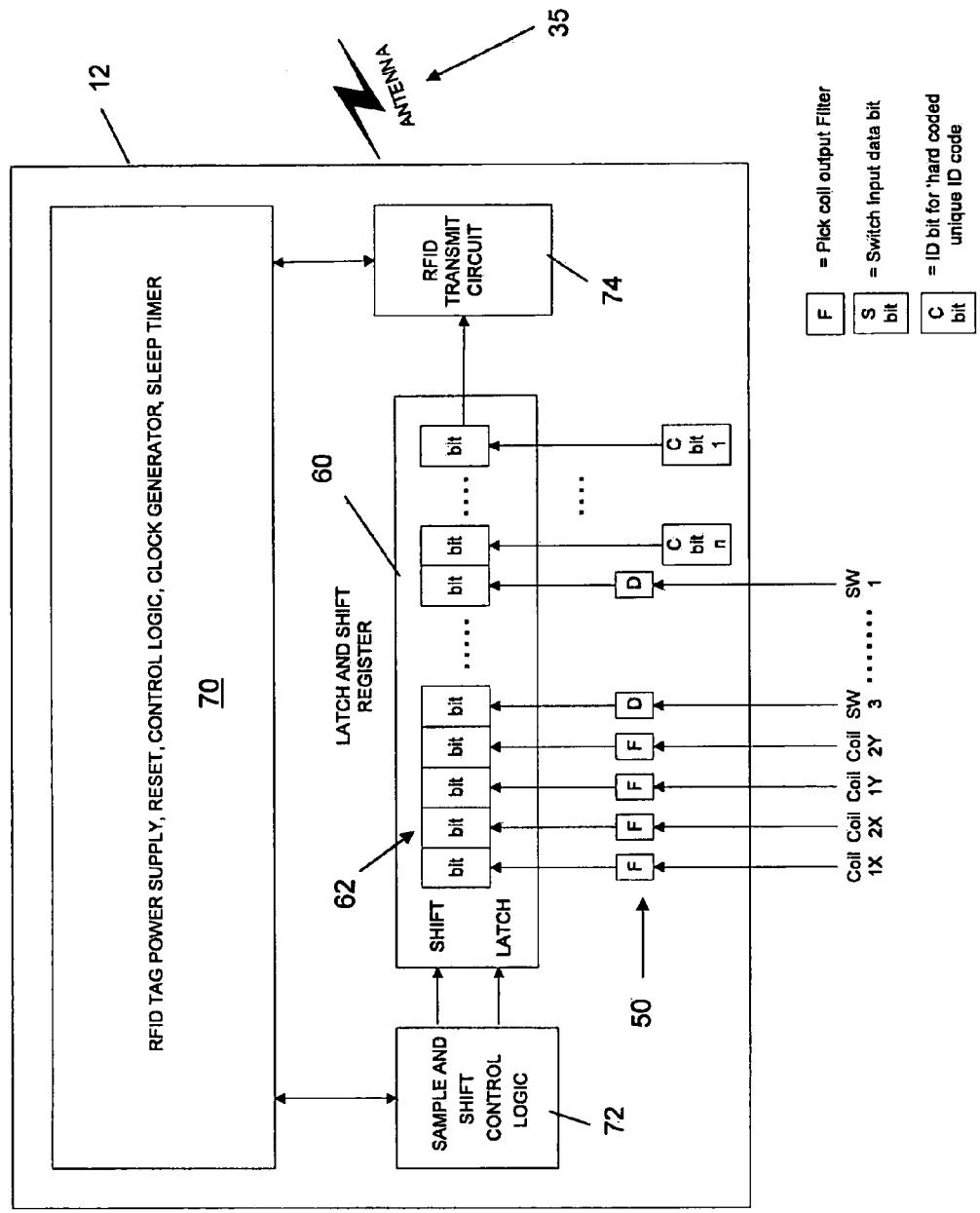
FIG. 4 illustrates a schematic diagram of a passive RFID tag receiving sensor inputs from coils in accordance with one exemplary embodiment of the present invention.

In accordance with one exemplary embodiment, the x-axis wheel 18 and the y-axis wheel are at 90 degrees with respect to each other. The x-axis wheel 18 and the y-axis wheel translate the motion of ball 16 into X and Y coordinates respectively. Each sensor wheel (18, 20) can rotate in a 360-degree rotation in accordance with one exemplary embodiment. The size of each sensor wheel is dependent on the size of ball 16 and can vary depending on the application. The x-axis wheel 18 and the y-axis wheel activate the first set of sensing devices 22 and the second set of sensing devices 24 respectively; however, for simplistic purposes the configuration and operations of the x-axis wheel 18 and the first set of sensing devices 22 are discussed in greater detail. In one exemplary embodiment, the x-axis wheel 18 has magnetic strips 40 and not-magnetic spaces 42 along its outer periphery as shown in FIGS. 2 and 3. An axle 44 extends from the x-axis wheel and contacts ball 16 as shown. The x-axis wheel 18 rotates as axle 44 rotates in response to the movement of ball 16. The magnetic strips 40 may be fabricated onto the outer periphery of the x-axis wheel 18 directly or onto a belt, which is then coupled to the perimeter of the wheel. In this embodiment, the plurality of magnetic strips 40 activate the first set of sensing devices 22, which comprises coils 50, 52 (labeled 1 and 2 respectively) in accordance with one exemplary embodiment. In accordance with one exemplary embodiment, coil 50 is located directly under one of the magnetic strips 40 while coil 44 is offset half way between one of the magnetic strips 40 and one of the spaces 42 as shown. The coils 50, 52 each include wound copper wires that sense the magnetic strips 40 of the x-axis wheel 18 through magnetic induction as the wheel rotates. In operation, as the x-axis wheel rotates, the moving magnetic strips 40 create an electric field in each of wound copper wires of the coils 44, 46. This creates a voltage potential across the ends of the copper wires of each of the coils 44, 46 when the magnetic strips 40 pass adjacent to the coils 44, 46, and zero voltage potential across each of the coils 44, 46 when no magnet is present. The voltage potential from the coils form voltage signals, which may be part of the sensor inputs 34 received by the passive RFID tag 32. In accordance with one exemplary embodiment, filter devices 50 of the passive RFID tag 32 correspondingly filter the voltage signals from the coils 44, 46 as shown in FIG. 4. The width of magnetic strips, non-magnetic spaces, diameter of wheel axles, and diameter of the wheel can be increased or decreased in various relationships to adjust the resolution of X and Y movement data. For example, decreasing the width of strips and spaces, and increasing the number of strips and spaces will increase the number of electric pulses per unit time and thus increase the resolution. Reducing the wheel axle increases the wheel RPM thus increasing the number of electric pulses and the resolution. The sampling frequency inside the RFID tag is adjusted accordingly to correctly transmit data for the modified movement resolution.

In accordance with one exemplary embodiment, the filtered voltage signals result in a square wave with frequency directly proportional to the speed of the rotating x-axis wheel. As such, the rate at which ball 16 is rotating in the X-Y direction may be determined by the pulses of the square wave, which may also be decoded by the RFID reader 36 to move the cursor across the display screen of the computer 14 at the detected rate. The filter devices 50 reduce electrical noise and increase the rise and fall transition of the square waveform.

The voltage signals generated from the coils 44, 46 determine direction (left or right) at which the x-axis wheel is rotating. In operation, when x-axis wheel 18 is rotating counterclockwise indicative of the x-axis wheel moving in the left direction, one of the magnetic strips 40 passes coil 44 (#1) first then coil 46 (#2) next. When the x-axis wheel 18 is rotating clockwise indicative of the x-axis wheel moving in the right direction, one of the magnetic strips 40 passes coil 46 (#2) first then coil 44 (#1) next. The magnetic strips 40 are spaced such that the magnets create the pulses previously described. This technique of offsetting the coils (44, 46) is used for this type of speed/direction sensing.

It should be understood that the y-axis wheel 18 and the second set of sensing devices 22 may also be configured to operate in a similar fashion to the x-axis wheel 18 and the first set of sensing devices 22 as described above but for sensing a different direction (up/down).

Figure 5:
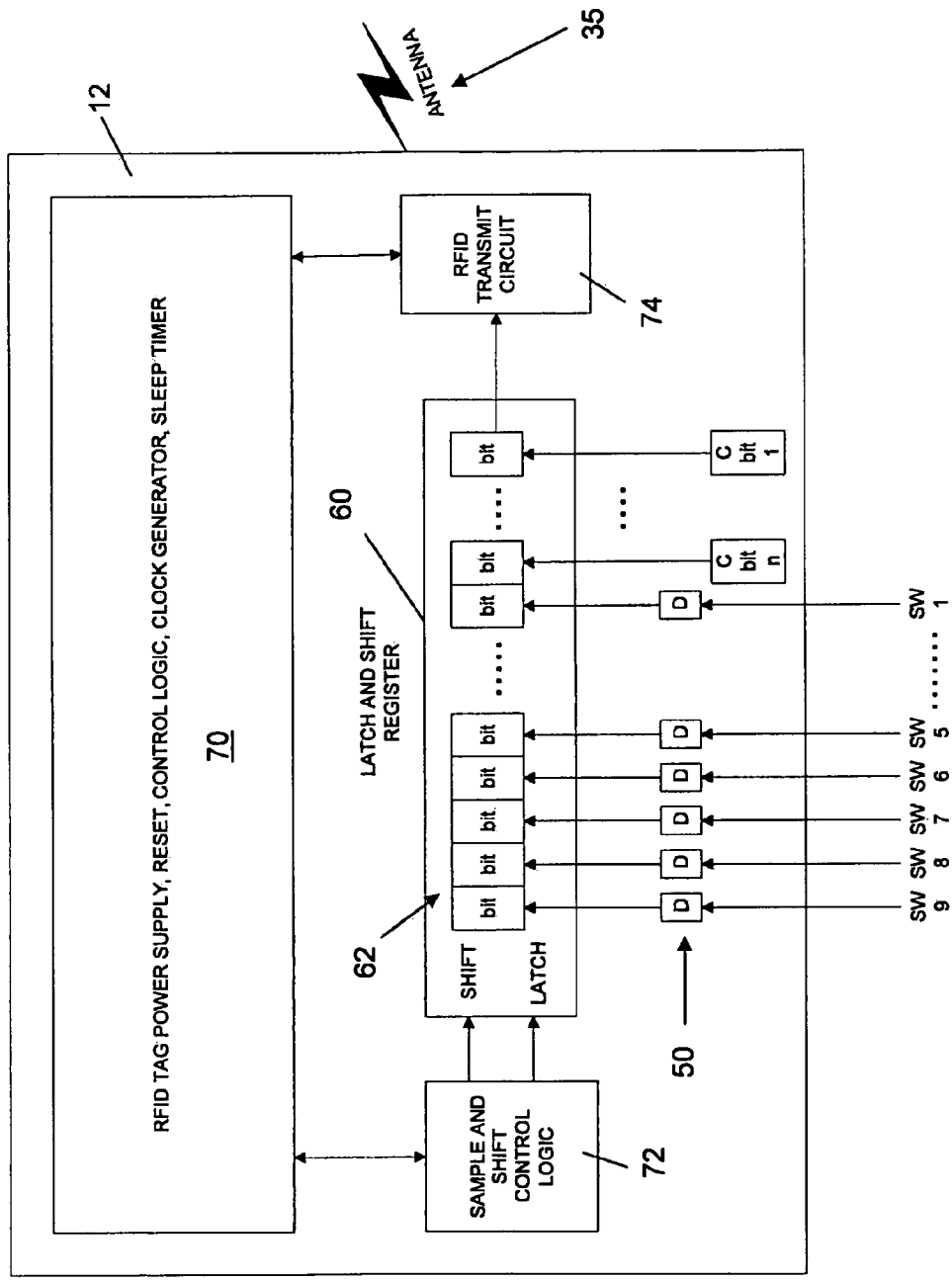
FIG. 5 illustrates a schematic diagram of the passive RFID tag receiving sensor inputs from mechanical switches in accordance with one exemplary embodiment of the present invention.

In an alternative exemplary embodiment, the magnetic strips on the x-axis wheel 18 are substituted with small bumps. In this embodiment, the small bumps active the first set of sensing devices 22, which in accordance with another exemplary embodiment comprises spring-loaded switches. Of course, any type of mechanical switches can be implemented in other exemplary embodiments of the present invention. In operation, the small bumps activate the switches in an on/off state when the x-axis wheel 18 rotates. The switches are in a spaced relationship with one another and with respect to the outer circumference the x-axis wheel 18 such that one switch activates before the other switch of the first set of sensing devices 22 during operation. The pattern of the switch positions (open/close) of the switches operating in concert with each other is indicative of the direction (left/right) of ball 16 along the x-axis. In accordance with one exemplary embodiment, the switches open and close at a rate proportional to the speed of the ball 16 along the X direction. The changes in switch position are part of the sensor inputs 34 and can be interpreted as "1"s or "0"s. In accordance with one exemplary embodiment, the filter devices 50 are substituted with switch debounce circuits for filtering the sensor inputs from the switches as shown in FIG. 5. This same technique (the use of mechanical switches) also works for the y-axis wheel 18 and the second set of sensing devices 22 but for sensing a different direction (up/down).

In accordance with one exemplary embodiment, a shift register 60 of the passive RFID tag 32 receives and stores the input signals 34 generated from the first set of sensing devices 22 and the second set of sensing device 24 after being filtered (the sensing devices can either be coils or mechanical switches depending on the application). The shift register 60 stores the filtered input signals 34 into a single bit stream 62 in accordance with one exemplary embodiment. More specifically, the input signals from the coils or mechanical switches from the first set of sensing devices 22 are stored in the single bit stream 62 as two corresponding bits in the single bit stream 62 and the input signals from the coils or mechanical switches of the second set of sensing devices 24 as two other corresponding bits in the single bit stream 62. In one exemplary embodiment, the sensor inputs 34 further include signals from mouse button 26, 28, and 30 indicative of pressing the right, left, or middle command button on the mouse. The single bit stream also stores the signals from mouse button 26, 28, and 30 as bits. In addition to transmission of data bits, synchronization bits are included in the shift register by the control logic by presently known methods and transmitted with each shift register data packet to allow the RFID reader to maintain the bit order of the serial shift register contents.

In accordance with one exemplary embodiment, a controller 70 along with other conventional mouse components operably control the shift register 60 to record or sample the switch positions at a given point in time based on a defined sampling frequency and serially shift the bits out of the shift register 60 one bit at a time to the RFID reader 36 using control logic, indicated by logic box 72. In accordance with one exemplary embodiment, an RFID transmit circuit 74 of the passive RFID tag 32 transmits the bits in a serial fashion over the antenna 35 of the passive RFID tag 32. The passive RFID tag 32 continuously transmits the bits of information in real-time to the RFID reader 36 for decoding and moving the cursor across the screen of the computer 14.

In accordance with one exemplary embodiment, a fixed identification code is hard-coded to the shift register 60 as bits (C bit n-C-bit 1) to uniquely identify the passive RFID tag 32. This enables the passive RFID tag 32 to communicate with the RFID reader 34 without interference of other nearby RFID readers.

Exemplary embodiments of the present invention use the motion of the mouse across the desk top (energy provided by the users hand) to sense X and Y axis direction/rate and a modified passive RFID tag to communicate the change in X and Y direction/rate to the host computer. The passive RFID tag 32 is conventionally powered through the air in the form of radio frequency energy utilizing antenna 35—the same energy used to communicate data through the air. As such, an internal (e.g., batteries) or any conventional power source (e.g., wired power source) is not required.

Exemplary embodiments of the present invention use a single passive RFID tag in the mouse for transmitting information of the movement and speed of the ball in the X-Y direction as well as whether the right, left, or middle command button has been depressed in a single bit stream. This simplifies the circuitry/hardware on the mouse and the circuitry/hardware and decoding program on the RFID reader end.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. An RFID wireless computer mouse system, comprising:
   a mouse comprising:
      a ball configured to move in an x-direction and a y-direction;
      an x-axis wheel and a y-axis wheel each configured to rotate in response to the movement of the ball, the x-axis wheel translates the motion of the ball in the x-direction while the y-axis wheel translates the motion of the ball in the y-direction;
      a first set of sensing devices and a second set of sensing devices, the first set of sensing devices detects the motion of the ball in the x-direction based on the movement of the x-axis wheel while the second set of sensing devices detects the motion of the ball in the y-direction based on the movement of the y-axis wheel; and
      a single passive RFID circuit coupled to the first set of sensing devices and the second set of sensing devices, the single passive RFID circuit receives a plurality of sensor inputs correspondingly from the first set of sensing devices and the second set of sensing devices indicative of the motion of the ball in the x-direction and the y-direction respectively, and the single passive RFID circuit stores the plurality of sensor inputs in a shift register as a stream of bits and serially shifts and transmits the stream of bits one bit at a time over an antenna of the single passive RFID circuit; and
   an RFID reader in signal communication with the single passive RFID circuit, the RFID reader decodes the stream of bits and converts the stream of bits into corresponding x-coordinates and y-coordinates used to move a cursor on a display screen of a computer, the single passive RFID circuit and the RFID reader move the cursor on the display screen of the computer, wherein the mouse operates without the use of an internal or a conventional power source.

* * * * *